(12) United States Patent
Philbrick et al.

(10) Patent No.: US 12,675,780 B1
(45) Date of Patent: Jul. 7, 2026

(54) SYSTEMS AND METHODS FOR PHYSICAL MANIFESTATION OF DIGITAL CURRENCY

(71) Applicant: United Services Automobile Association (USAA), San Antonio, TX (US)

(72) Inventors: Ashley Raine Philbrick, San Antonio, TX (US); Roberto Virgillio Jolliffe, San Antonio, TX (US); Joel S. Hartshorn, Port Orchard, WA (US); Jennifer Marie Chandler-Bradley, Tampa, FL (US); Belinda Luna-Pulido, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 167 days.

(21) Appl. No.: 18/308,048

(22) Filed: Apr. 27, 2023

Related U.S. Application Data

(60) Provisional application No. 63/335,966, filed on Apr. 28, 2022.

(51) Int. Cl.
　　G06Q 20/10 (2012.01)
　　G06Q 20/36 (2012.01)
(52) U.S. Cl.
　　CPC ......... G06Q 20/10 (2013.01); G06Q 20/3672 (2013.01); G06Q 20/3674 (2013.01); G06Q 20/3678 (2013.01); *G06Q 2220/00* (2013.01)
(58) Field of Classification Search
　　USPC ......................................................... 705/66
　　See application file for complete search history.

(56) References Cited

U.S. PATENT DOCUMENTS

| | | | |
|---|---|---|---|
| 11,909,860 B1 * | 2/2024 | So | G06Q 40/06 |
| 2022/0058633 A1 * | 2/2022 | Yantis | G06Q 20/123 |

(Continued)

FOREIGN PATENT DOCUMENTS

| | | | | |
|---|---|---|---|---|
| WO | WO-2020110077 A1 * | 6/2020 | | H04L 9/50 |
| WO | WO-2021250129 A1 * | 12/2021 | | H04L 9/50 |

OTHER PUBLICATIONS

Kanak, A., et al. "Diamond Accountability Model for Blockchain-enabled Cyber-Physical Systems", 2020 IEEE International Conference on Human-Machine Systems (ICHMS) (2020, pp. 1-5) (Year: 2020).*

*Primary Examiner* — Clay C Lee
(74) *Attorney, Agent, or Firm* — Fletcher Yoder, P.C.

(57) ABSTRACT

A method for providing a physical manifestation of digital currency includes receiving, via an input at a user device, a request for generating a digital currency token, where the request includes an instruction for transferring an amount of digital currency from a digital currency wallet to a token wallet linked with the digital currency token. The method includes generating, via a manufacturing system, the digital currency token, where the digital currency token enables access to the token wallet. The method also includes verifying, via a processing system, presence of the amount of digital currency on the digital currency wallet. The method further includes, in response to verifying the presence of the amount of digital currency, transferring, via the processing system, the amount of a digital currency to the token wallet such that access to the digital currency involves possession of the digital currency token.

18 Claims, 9 Drawing Sheets

(56)        References Cited

U.S. PATENT DOCUMENTS

2023/0214792 A1*  7/2023  Lee ........................ G06Q 20/02
                                                  705/75
2024/0346087 A1*  10/2024  Quigley ................. G06F 16/22

* cited by examiner

SYSTEMS AND METHODS FOR PHYSICAL MANIFESTATION OF DIGITAL CURRENCY

CROSS-REFERENCE TO RELATED APPLICATION

This application claims priority to and the benefit of U.S. Provisional Application No. 63/335,966, entitled "Systems and Methods for Physical Manifestation of Digital Currency," filed Apr. 28, 2022, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Digital currency, including but not limited to cryptocurrency, has become increasingly prevalent as digital infrastructures continue to expand. Such digital currencies, however, may be subject to unique challenges not typically experienced by non-digital currencies (e.g., tangible or conventional currencies). By way of example, it may be difficult for users to track an amount of digital currency in their possession and/or exchange digital currency with other users as such digital currency lacks a physical manifestation. Moreover, for such reasons, conventional transactional partners, such as banking, financial, or insurance institutions, which might typically facilitate currency, banking, or financial transactions, may be unable, uninterested, or unwilling to engage in transactions involving digital currencies.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method for providing a physical manifestation of digital currency includes receiving, via an input at a user device, a request for generating a digital currency token, where the request includes an instruction for transferring an amount of digital currency from a digital currency wallet to a token wallet linked with the digital currency token. The method includes generating, via a manufacturing system, the digital currency token, where the digital currency token enables access to the token wallet. The method also includes verifying, via a processing system, presence of the amount of digital currency on the digital currency wallet. The method further includes, in response to verifying the presence of the amount of digital currency, transferring, via the processing system, the amount of a digital currency to the token wallet such that access to the digital currency involves possession of the digital currency token.

In a further embodiment, a method for providing a physical manifestation of digital currency includes receiving, at a processing system, an instruction for generating a digital currency token, where the instruction includes design instructions for the digital currency token, and where the design instructions indicate one or more physical attributes of the digital currency token. The method includes generating, via a manufacturing system, the digital currency token in accordance with the design instructions, where the digital currency token includes a linking element configured to associate the digital currency token with a token wallet corresponding to the digital currency token. The method also includes receiving, at the processing system, an additional instruction for transferring an amount of digital currency from a digital currency wallet to the token wallet. The method further includes, in response to receiving the additional instruction, transferring, via the processing system, the amount of digital currency from the digital currency wallet to the token wallet.

In another embodiment, a method for providing a physical manifestation of digital currency includes receiving, at a receptacle of a manufacturing system, an object serving as basis for a digital currency token. The method includes printing, via a print head of the manufacturing system, a linking element of the digital currency token onto the object, where the digital currency token is associated with a token wallet configured to receive digital currency. The method also includes receiving, at a processing system, an instruction for transferring an amount of digital currency from a digital currency wallet to the token wallet. The method also includes, in response to receiving the instruction, transferring, via the processing system, the amount of digital currency from the digital currency wallet to the token wallet.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
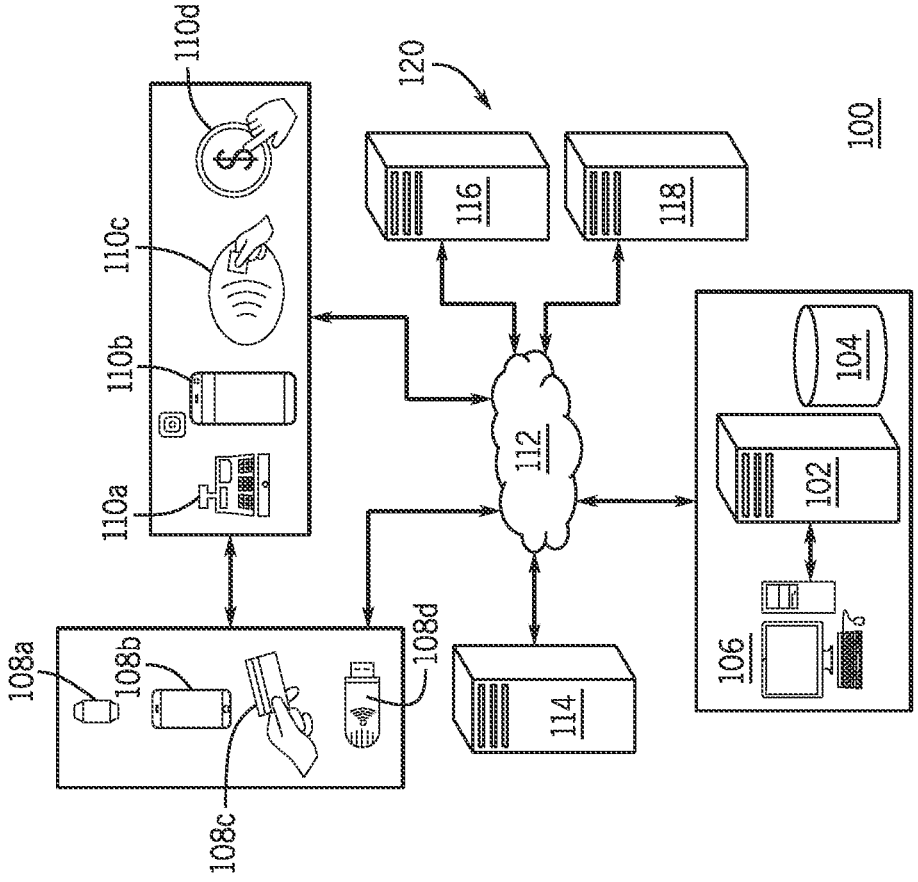
FIG. 1 is a schematic of an embodiment of a network environment that may function as or otherwise support a digital currency infrastructure, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, a digital currency (or currencies) may be understood to be a currency that exists or is available in a digital or electronic form. Correspondingly, such digital currencies are accessible and/or exchangeable via an electronic intermediary, such as a processor-based system that may take the form of a cellular telephone, a table computer, a laptop or portable computer, a desktop computer or workstation, and so forth. By way of example, a digital currency may be, but is not limited to, a cryptocurrency, such as Bitcoin, Ethereum, Ripple, and so forth.

As discussed herein, the adoption of digital currency in various aspects of modern life has been associated with various challenges. Certain challenges may relate to the lack of a physical manifestation (e.g., a tangible or physical analog) of the digital currencies. For example, it may be difficult for users to track an amount of digital currency in their possession as there is no tangible (e.g., physical) item for the user to view, interact with, and/or store as a representation of the digital currency. Moreover, such lack of tangible representations for digital currency may make it difficult for users to share, exchange, or otherwise trade digital currencies with other users, particularly users that may be unfamiliar or not well versed in the space of digital currency. Further, for such reasons, conventional transactional partners, such as banking, financial, or insurance institutions, which might typically facilitate currency, banking, or financial transactions, may be unable, uninterested, or unwilling to engage in transactions involving digital currencies.

As discussed herein, various aspects of the present disclosure relate to systems and methods for providing a physical manifestation of digital currency. To this end, the presently disclosed techniques may provide users with tangible items that are associated with a designated amount of digital currency and, thus, may facilitate awareness and understanding of digital currency transaction, storage, and/or accumulation. For example, disclosed herein is a system (e.g., a processing system) configured to generate (e.g., manufacture) digital currency tokens that may be associated with a particular amount of digital currency. In particular, the system may be configured to allocate digital currency to a token wallet of the digital currency token. The token wallet may be configured to receive and store one or more types of digital currency (e.g., Bitcoin, Ethereum, Ripple). As such, storage (e.g., physical storage) of the digital currency token by a user and/or exchange (e.g., physical exchange) of the digital token between users may facilitate storage and/or exchange of the corresponding digital currency stored on the token wallet associated with the digital currency token. Further, the disclosed system may be configured to generate a linking element of the digital currency token that may be applied (e.g., printed, coupled, affixed) to an object (e.g., a family heirloom, such as a baseball, another object) to assign value to the object in the form of digital currency. That is, the object may serve as a physical manifestation of a user-designated amount of digital currency. As such, physical exchange of the object in the real world (e.g., between users) may facilitate exchange of the corresponding amount of digital currency associated with the liking element of that object. As such, the object may serve as a basis for the digital currency token. These and other features will be discussed in detail below with reference to the accompanying drawings.

With the preceding in mind, and by way of introduction to certain aspects that may be employed in a digital currency infrastructure as discussed herein, FIG. 1 depicts certain illustrative components and/or features of a network environment 100 that may be present in a digital currency infrastructure in accordance with certain embodiments. As shown, the illustrative network environment 100 may include a digital transactions server 102, a database 104, a computer terminal 106, user transaction (e.g., digital payment) devices 108a, 108b, 108c, and 108d (collectively or commonly referred to as user devices 108), digital currency transaction devices (e.g., point of sale devices, digital currency automated teller machines [ATMs], and so forth) 110a, 110b, 110c, and 110d (collectively and commonly referred to as 110), a merchant server 114, a financial institution server (e.g., an acquiring bank server) 116, a facilitating server 118, and so forth. It should be understood that these components are merely illustrative and additional or alternative devices may also be present and/or certain of the illustrated devices may be absent, in various embodiments of a digital currency infrastructure as discussed herein.

By way of further example, in certain embodiments the digital transactions server 102 may be one or more processor-based systems (e.g., a suitable computing device or collection of computing devices) that may generate, maintain, or update an digital currency wallet or digital currency containing account as discussed herein. The digital transactions server 102 may include, for example, a server computer, a desktop computer, a laptop computer, a tablet computer, and a smartphone. Regardless of the form, the digital transactions server 102 may include a non-transitory storage storing a plurality of computer program instructions and a processor executing the plurality of computer program instructions. The non-transitory storage medium may include any form of electronic memory or electronic storage such as random-access memory (RAM) and hard disk drives. The processor may be any kind of processor such as an x86 processor, a MIPS processor, and an ARM processor. The digital transactions server 102 may be also be connected to a database 104. The database 104 may store data records containing information of a plurality of users, a plurality of user devices 108, a plurality of digital currency transaction devices 110, and/or any other entities. The digital transactions server 102 may perform one or more database queries, retrievals, and/or updates for authenticating and/or transacting with each user in the network environment 100. The database 104 may be hosted by a plurality of hardware components such as memory chips, hard disk drives, optically readable devices, and/or any other type of hardware components. It should be understood that although the database 104 is shown separately from the digital transactions server 102, the database 104 may be within the digital transactions server 102.

A computer terminal 106 may be connected to the digital transactions server 102. The computer terminal 106 may allow a system administrator to access the resources and the functionality of the digital transactions server 102. The computer terminal 106 may also allow the system administrator to program/configure the digital transactions server 102 to implement the functionality described throughout this disclosure. The computer terminal 106 may also present an interface for the system administrator to monitor the operation of the digital transactions server 102 and/or perform other ancillary operations associated with a digital currency infrastructure as described herein.

The user devices 108 may be any kind of electronic device that a user may use to access a digital currency wallet or account, such as for transacting with digital currency transaction devices 110, such as to make a purchase, trade or exchange digital currencies, and so forth. Non-limiting examples of user devices 108 may include, but are not limited to, a smartwatch 108a, a mobile phone 108b, a card 108c, and a token device 108d (e.g., a digital currency token as discussed herein). It should however be understood that these are merely illustrative and devices with other form factors and other functionality should be considered within the scope of this disclosure. The smartwatch 108a and the mobile phone 108b may include a processor for executing instructions, a memory for storing the instructions and the inputs and results respectively utilized by and generated by the processor, and a wireless antenna to communicate with other devices, such as digital currency transaction devices 110. Furthermore, the smartwatch 108a and the smartphone 108b may communicate through the network 112 to the digital transactions server 102. A card 108c on the other hand may not necessarily have a processor though may include a chip-based memory or identifier that may be utilized in digital currency transactions. In certain embodiments, the token device 108d may have chip-based functionality (e.g., memory or data storage, pseudo-random number generation capabilities, chip-based authentication or multi-factor authentication, and so forth) that may also be utilized in digital currency transactions.

The digital currency transaction devices 110 may include any kind of processor-based systems (e.g., computing devices) that may facilitate a digital currency based transaction initiated by a user, such as a purchase of goods or services, acquisition of digital currency, exchange of digital currency, and so forth. The digital currency transaction devices 110 may be, for example, at checkout counters of retail stores providing scanning and payment functionality or may be an ATM (e.g., a Bitcoin ATM) similarly configures to interact with a user and user device 108. Non-limiting examples of digital currency transaction devices 110 may include a cash register 110a (also referred to as a point of sale (POS) terminal), a mobile phone with a payment dongle 110b, a contactless payment device 110c, and an online payment gateway 110d. In certain embodiments, the digital currency transaction device 110 may communicate with the digital transactions server 102 and/or, as appropriate a merchant server 114.

The network 112 may be any kind of network, including any type of packet switching or circuit switching network. The network 112 may therefore contain any kind of packet switching or circuit switching communication links. These communication links may be either wired or wireless. For example, the network 112 may include packet switching networks such as a local area network (LAN), metropolitan area network (MAN), wide area network (WAN), and the Internet. The network 112 may include or be in communication with ad hoc networks/links such as a Bluetooth communication or a direct wired connection. The network 112 may also include circuit switching network as a telephony network containing wired and/or wireless telephony communication links. Therefore, network of any order of complexity should be considered within the scope this disclosure.

When present, a merchant server 114 may be any kind of suitable processor-based system (e.g., a computing device) that may communicate with the digital currency transaction device(s) 110 through the network 112. In a retail environment, the digital currency transaction device(s) 110 may be within retail stores and a merchant server 114 may track the purchases made through a plurality of digital currency transaction devices 110. The merchant server 114 may also communicate with one or more of digital transactions server 102, an acquiring bank server 116, and/or a facilitating server 118. The acquiring bank server 116 may be a suitable processor-based system (e.g., computing device) that may receive information (e.g., payment or refund information) to be processed from the merchant server 114 through the network 112. The facilitating server 118 may be a suitable processor-based system (e.g., computing device) that may facilitate communication between the acquiring bank server 116 and the digital transactions server 102. Throughout the present disclosure, the transactions server 102, the computer terminal 106, the merchant server 114, the acquiring bank server 116, the facilitating server 118, or any combination thereof, may be referred to herein as a processing system 120, which may be configured to execute or otherwise perform the disclosed techniques. That is, the techniques discussed herein may be performed by any one or combination of the transactions server 102, the computer terminal 106, the merchant server 114, the acquiring bank server 116, and/or the facilitating server 118.

Figure 2:
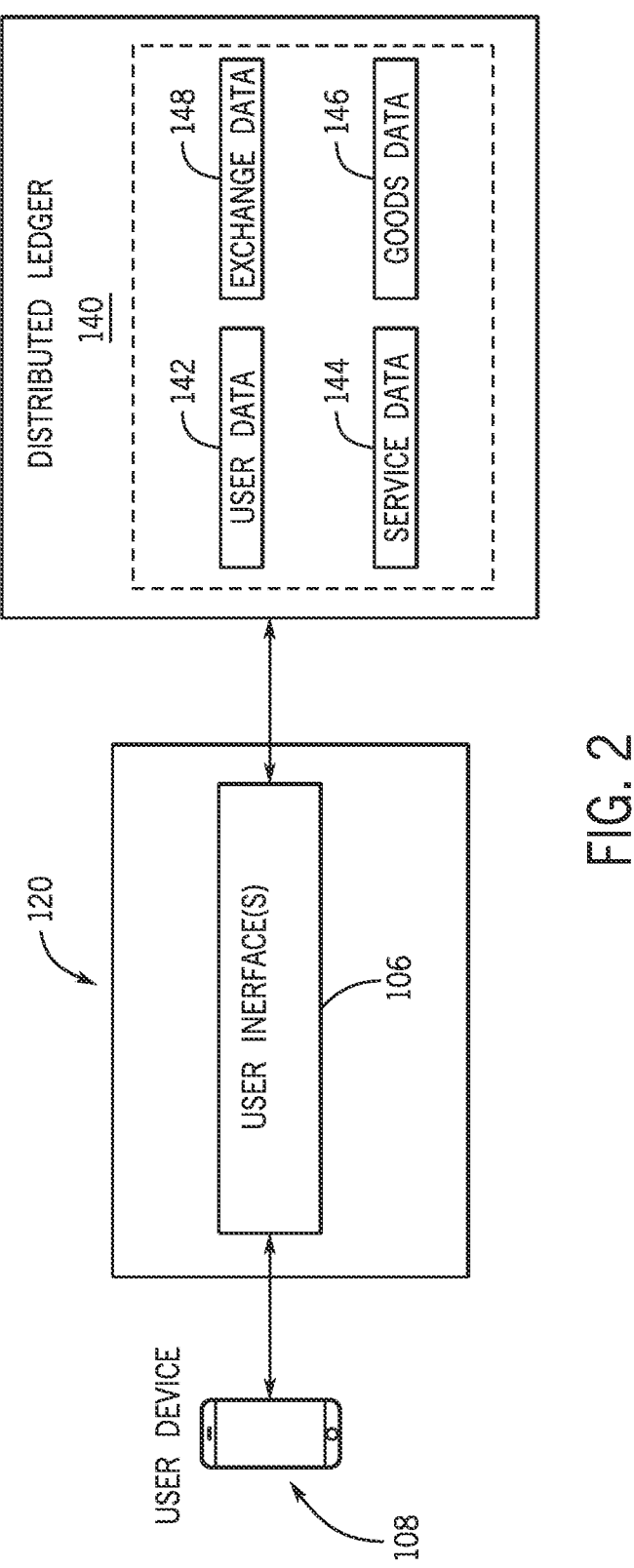
FIG. 2 is a schematic of an embodiment of a portion of a processing system for supporting a digital currency infrastructure, in accordance with embodiments described herein.
Figure 3:
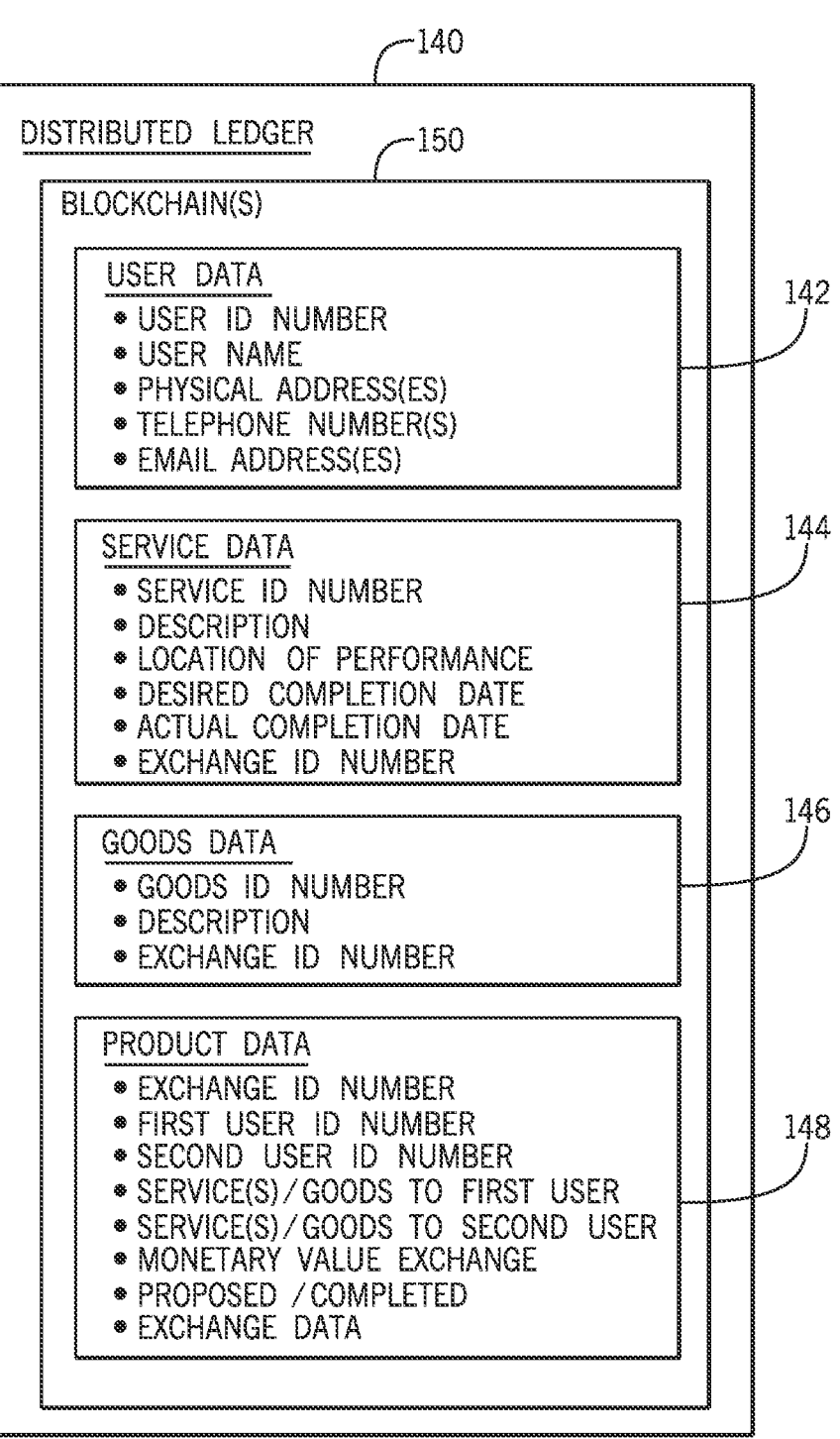
FIG. 3 is a schematic of an embodiment of a distributed ledger that may be utilized by a processing system supporting a digital currency infrastructure, in accordance with embodiments described herein.

As illustrated in FIG. 2, the processing system 120 may host a distributed ledger 140 that may include one or more blockchains. The distributed ledger 140 may be hosted on any suitable number of computing devices (e.g., computing devices of the processing system 120) that operate as nodes for the distributed ledger 140. Such nodes may be geographically distributed in any suitable number of locations. The distributed ledger 140 may store any appropriate number of data records of various types, including user data 142, service data 144, goods data 146, and exchange data 148, among other types of data. As illustrated in FIG. 3 and described in greater detail herein, in certain embodiments, the distributed ledger 140 may include blockchains 150 that store user data 142 associated with users of the processing system 120. The user data 142 may include a user identification (ID) number (e.g., social security number, driver's license number, customer ID number, employee ID number, student ID number, and so forth) of the user, a name of the user, one or more physical address(es) of the user, one or more telephone number(s) for the user, and one or more email address(es) for the user, among other data. In addition, in certain embodiments, the service data 144 may include a service ID number, a description of the service, a location for performance of the service, a desired completion date for the service, an actual completion date for the service, and an exchange ID number relating to a particular exchange of which the service was a part, among other data. In addition, in certain embodiments, the goods data 146 may include a product ID number, a description of the product, and an exchange ID number relating to a particular exchange of which the product was a part, among other data. In addition, in certain embodiments, the exchange data 148 may include an exchange ID number for an exchange, a first user ID number for a first party of the exchange, a second user ID number for a second party of the exchange, one or more service(s) and/or product(s) (e.g., as identified by their respective service ID number(s) and/or product ID number(s)) being exchanged to the first party as part of the exchange, one or more service(s) and/or product(s) (e.g., as identified by their respective service ID number(s) and/or product ID number(s)) being exchanged to the second party as part of the exchange, a monetary value that is exchanged to/from the first party to the second party as part of the exchange, whether the exchange is merely proposed or has actually been completed, and the exchange date if the exchange has actually been completed, among other data.

It will be appreciated that the types of data described herein are merely exemplary, and not intended to be limiting. Furthermore, it will also be appreciated that each of these types of data may be related to each other in a one-to-one or one-to-many manner, as appropriate, depending on the particular type of relationship between the data types. Returning now to FIG. 2, the processing system 120 may have access to the distributed ledger 140. In certain embodiments, the processing system 120 may support nodes that host at least a portion of the distributed ledger 140. Alternatively, the distributed ledger 140 may be hosted on computing device(s) other than those included in the processing system 120.

Figure 4:
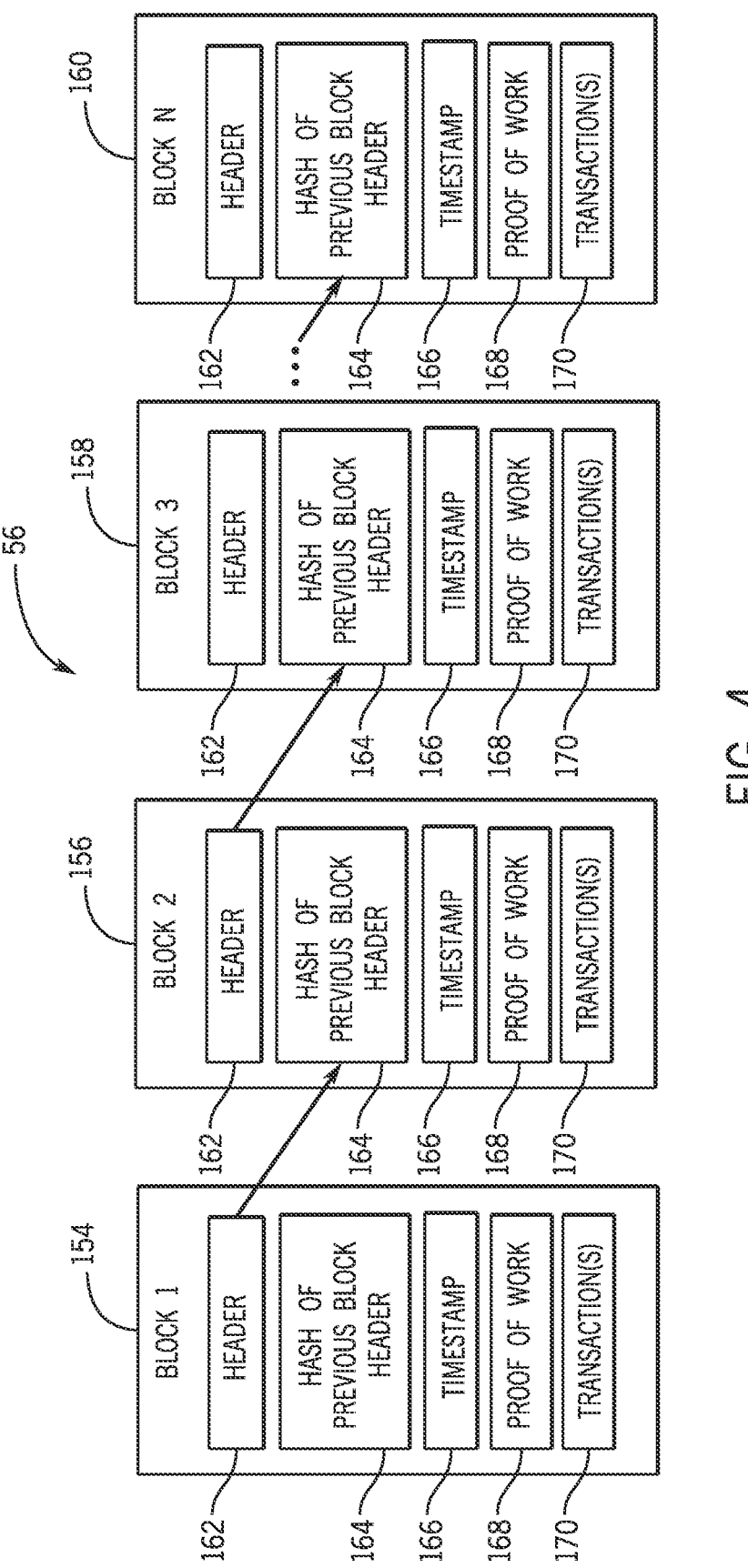
FIG. 4 is a schematic of an embodiment of a blockchain of a distributed ledger, in accordance with embodiments described herein.

FIG. 4 illustrates a block diagram of the distributed ledger 140 (e.g., having the blockchain 150), in accordance with embodiments described herein. In the illustrated embodiment, the distributer ledger 140 is illustrated as having multiple blocks 154, 156, 158, and 160. The block 154 (first block in the distributer ledger 140) may have been created, for example, by the processing system 120 and allocated as a special starting block. The block 154 may include a unique header 162 uniquely identifying the block 154 from other blocks in the distributer ledger 140. Because the block 154 is the first block in the distributer ledger 140, a hash of a previous block header 164 may be set to zero. A timestamp 166 may include the date of creation for the block 154, and a proof of work section 168 may include certain "work" that proves that a "miner" has performed work suitable for the creation of the block 154 and/or to verify transactions in the distributer ledger 140. The work section 168 may vary based on a protocol used to create the distributer ledger 140. For example, a bitcoin protocol may use a Merkle tree. The Merkle tree may be a tree data structure in which every leaf node is labelled with a hash (e.g., one-way hash) of a data block, and every non-leaf node is labelled with a cryptographic hash of the labels of its child nodes. Because of the one-way transformation used in hashing, the Merkle tree has the property that there is no known technique that a deceptive party could use to guess a value that would hash with a second-to-last value to create the Merkle root, which is know from a verified distributer ledger 140, and so on, down the tree. In other words, there is no way to create a fake value that would hash to an expected Merkle tree value (e.g., value stored in work section 168 of the block 154), thus creating a single value that proves the integrity of all of the transactions under it.

Transactions of digital currency, data (e.g., input(s) received by the processing system 120), and so forth, may be stored in a transactions section 170. Data related to the particular transaction may also be stored in transactions section 170 (or in another section), including the user data 142, the service data 144, the goods data 146, and the exchange data 148, among other data. In certain embodiments, a new block may be created when a new exchange is to be tracked, new data is to be added, and/or current data is modified. For example, new exchange data 148 may result in the creation of a new block. In another embodiment, empty blocks may be first created and then assigned, for example via the processing system 120, to new exchange data 148. New user data 142, new service data 144, and new goods data 146 may be similarly handled, in certain embodiments.

When a new block is created, the block will receive a new header 162 uniquely identifying the new block. A peer-to-peer network may include multiple "miners" (e.g., computing devices of the processing system 120, computing devices external to the processing system 120) that add blocks to the distributer ledger 140 based on the blockchain protocol. In general, multiple miners validate transactions 170 that are to be added to a block and compete (e.g., perform computing work, as introduced above) to have their respective block added to the distributer ledger 140. Validation of transactions 170 includes verifying digital signatures associated with respective transactions 170. For a block to be added to the distributer ledger 140, a miner must demonstrate a proof of work before their proposed block of transactions 170 is accepted by the peer-to-peer network, and before the block is added to the distributer ledger 140. In certain embodiments, a blockchain protocol include a proof of work scheme (e.g., Merkle Tree) that is based on a cryptographic hash function (CHF). An example CHF includes the secure hash algorithm 256 (SHA-256). In general, the CHF receives information as input, and provides a hash value as output, the hash value being of a predetermined length. For example, SHA-256 outputs a 256-bit (32-byte, 64-character) hash value. In certain embodiments, the hash value is a one-way hash value such that the output hash value cannot be "unhashed" to determine what the input was. In certain embodiments, the blockchain protocol may require multiple pieces of information as input to the CHF. For example, the input to the CHF may include a reference to the previous (most recent) block (e.g., hash 164) in the distributer ledger 140, details of the transaction(s) 170 that are to be included in the to-be-created block, and a "nonce" value (e.g., a random number used only once).

Multiple nodes may compete to hash a set of transactions 170, and to provide the next block that is to be added to the distributer ledger 140. In certain embodiments, the blockchain protocol may provide a threshold hash to qualify a block to be added to the distributer ledger 140. For example, the threshold hash may include a predefined number of zeros (0s) that the hash value must have at the beginning (e.g., at least the first four characters of the hash value must each be zero). The higher the number of zeros, the more computationally time-consuming it may be to arrive at a qualifying hash value.

In accordance with the blockchain protocol, each miner in the peer-to-peer network receives transaction information for one or more transactions that are to be included in a block that is to be added next in the distributer ledger 140. Each miner provides the reference to the previous (most recent) block in the distributer ledger 140, details of the transaction(s) 140 that are to be included in the to-be-created block, and the nonce value to the CHF that may then be used to provide a hash value. If the hash value does not meet the threshold hash (e.g., the first four characters of the hash value are not each zero), the miner starts again to provide another hash value, thus increasing the amount of work. Alternatively, if the hash value meets the threshold hash (e.g., at least the first four characters of the hash value are each zero), the respective miner may have successfully created the next block that is to be added to the distributer ledger 140. Consequently, the respective miner's block is broadcast across the peer-to-peer network (e.g., all user devices communicatively coupled to the processing system 120). At this point, all other miners cease work (because one miner was already successful), and all copies of the distributer ledger 140 are updated across the peer-to-peer network to append the block to the distributer ledger 140. Each miner may produce hundreds of thousands (or more) of hash values, before any one miner provides a qualifying hash value (e.g., at least the first four characters of the hash value are each zero).

It is to be noted that any computing device, such as individual computing devices or multiple computing devices of the processing system 120, may be miners. Accordingly, for example, as new user data 142, service data 144, goods data 146, and exchange data 148 are created, new blocks may be added to the distributer ledger 140, including blocks 154, 156, 158, and 160. Indeed, the distributer ledger 140 may continue to grow, storing new user data 142, service data 144, goods data 146, and exchange data 148. Because of the distributed nature of the peer-to-peer network created via the distributed ledger 140, each node (e.g., computing device) may include copies of the distributer ledger 140 and share copies of the distributer ledger 140 as new peers enter the peer-to-peer network. Each copy of the distributer ledger 140 may include verified information (e.g., data) for all or substantially all of the users, services, goods, and exchanges tracked by the distributed ledger 140. The information is secure, immutable, and more efficiently tracked as new data get added via the distributed ledger 140.

Figure 5:
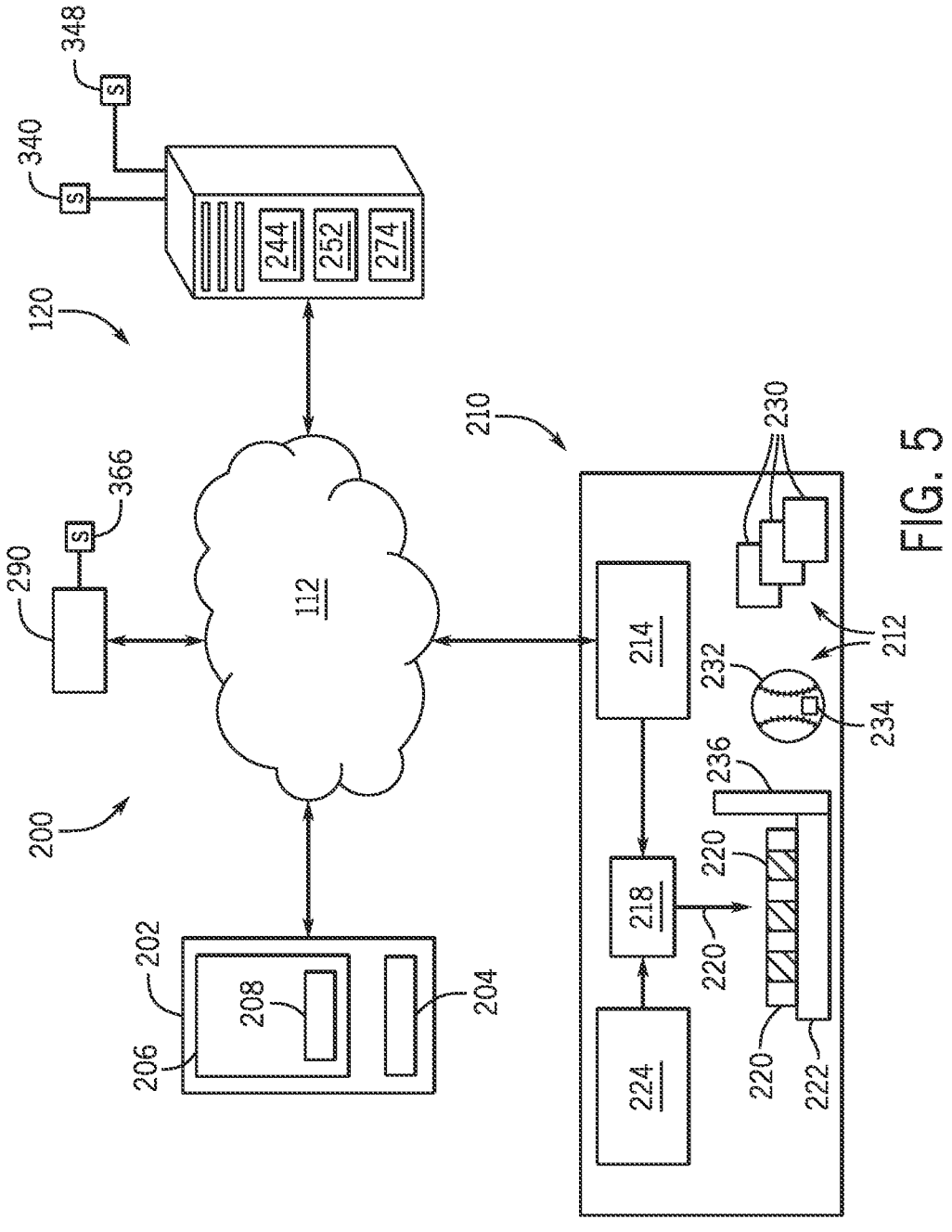
FIG. 5 is a schematic of an embodiment of a system for providing a physical manifestation of digital currency, in accordance with embodiments described herein.

FIG. 5 is a schematic of an embodiment of a system 200 for providing a physical manifestation of digital currency. The system 200 includes at least a portion of the processing system 120. The system 200 includes a user device 202 (e.g., one of the user devices 108, the computer terminal 106) that may be communicatively coupled (e.g., wireless coupled) to the processing system 120 via the network 112, for example. The user device 202 may include a cellular phone, a laptop, a tablet, a desktop computer, or another suitable electronic device. The user device 202 includes processing circuitry 204 that may be configured to perform some of or all of the techniques disclosed herein in addition to, or in lieu of, the processing system 120. As such, in certain embodiments, the processing circuitry 204 may form a portion of the processing system 120. The user device 202 may include a display 206 and the processing circuitry 204 may be configured generate a user interface 208 (e.g., a graphical user interface)

on the display 206. The user interface 208 may receive one or more user inputs (e.g., from a user of the system 200) in order to facilitate operation of the techniques disclosed herein.

In the illustrated embodiment, the system 200 includes a manufacturing system 210 that, as discussed in detail below, is configured to generate digital currency tokens 212 that are indicative of physical manifestations of digital currency. In some embodiments, the manufacturing system 210 may be an additive manufacturing system including, but not limited to: a binder jet additive manufacturing system, a direct metal laser melting additive manufacturing system, a direct metal laser sintering and/or laser deposition additive manufacturing system, a three dimension (3D) printing additive manufacturing system (e.g., configured to 3D print a polymeric material), a laser cutting device, a computer numerical control (CNC) machine, or combinations thereof. In any case, the manufacturing system 210 includes manufacturing system (MS) processing circuitry 214 that may be communicatively coupled to the processing system 120 via the network 112. The MS processing circuitry 214 may be configured to control the manufacturing system 210 based on instruction (e.g., control signals) received from the processing system 120 to facilitate generation of the digital currency tokens 212 in accordance with the disclosed techniques.

In some embodiments, the manufacturing system 210 includes a print head 218 that may be configured to deposit material 220 (e.g., one or more types of material) onto a platform 222 to facilitate generation (e.g., manufacturing, production) of the digital currency tokens 212. The print head 218 may be configured to receive a supply of the material from a material supply 224 of the manufacturing system 210. In certain embodiments, the manufacturing system 210 may be configured to print (e.g., manufacture) substantially all (e.g., more than 70 percent of, more than 80 percent of, more than 90 percent of) a particular digital currency token 212. That is, the manufacturing system 210 may be configured to manufacture substantially all of the body 230 of the digital currency token 212 using the material received from the material supply 224, for example.

In certain embodiments, the manufacturing system 210 may be configured to receive an existing object 232 (e.g., a baseball) and print (e.g., spray, draw, etch, engrave) a linking element 234 onto the object 232. As discussed in detail herein, the linking element 234 may enable the object 232 to act (e.g., serve as a basis for) a corresponding digital currency token 212. For example, the manufacturing system 210 may include a receptacle 236 that is configured to receive the object 232 (e.g., enable placement of the object on the platform 222). The manufacturing system 210 may include clamps, actuators, or other suitable devices configured to temporarily secure (e.g., affix) the object 232 on the platform 222. As such, the print head 218 may engage with the object 232 to print the linking element 234 onto a surface of the object 232, for example. As such, it should be understood that the digital currency tokens 212 may include multitudinous different types of physical (e.g., tangible) manifestations.

Figure 6:
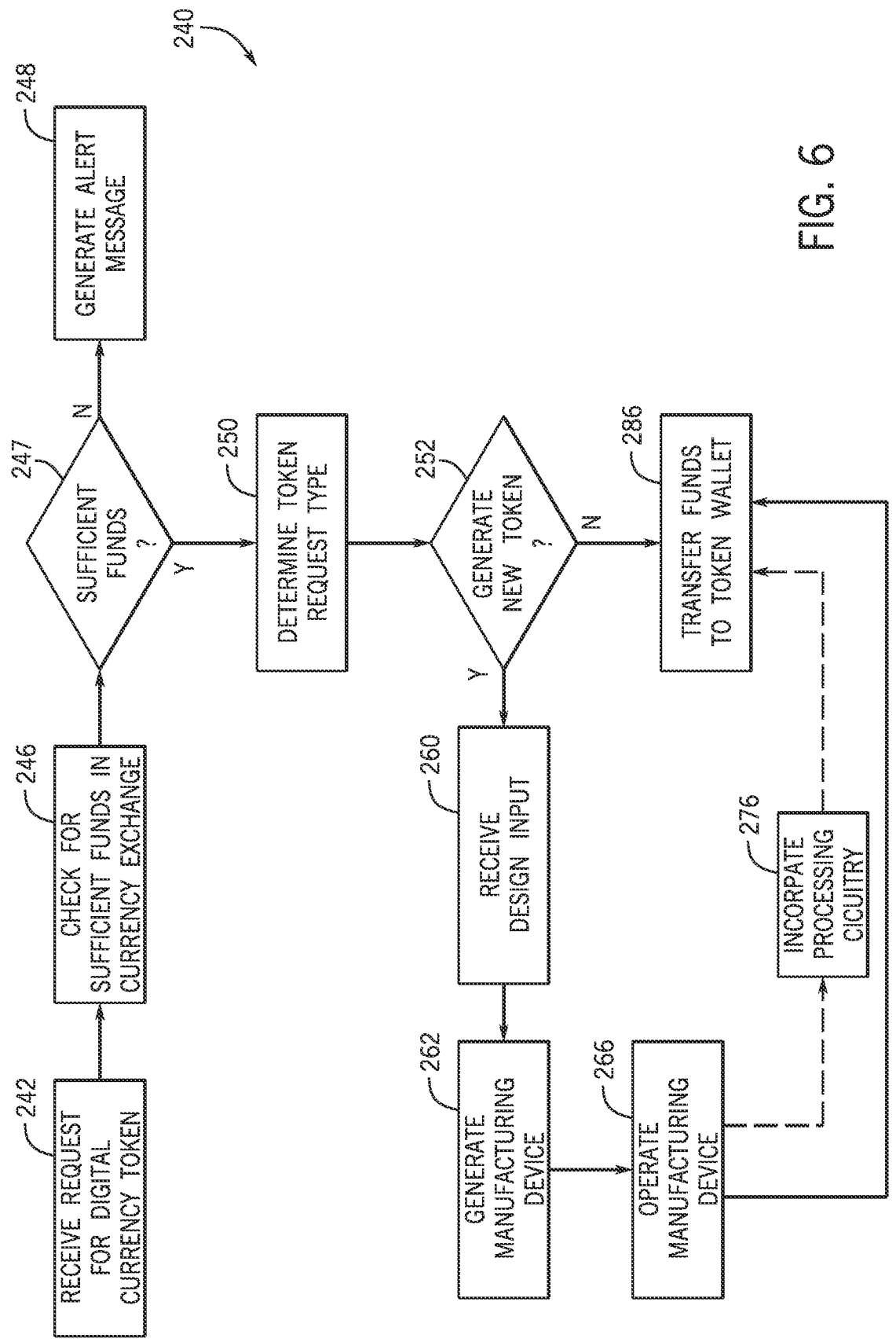
FIG. 6 is a schematic of an embodiment of a process for operating a system for providing a physical manifestation of digital currency, in accordance with embodiments described herein.

To facilitate the following discussion, FIG. 6 is flow diagram of an embodiment of a process 240 for operating the system 200 to generate the digital currency tokens 212 in accordance with the presently disclosed techniques. FIG. 6 will be referred to concurrently with FIG. 5 throughout the following discussion. It should be noted that the steps of the process 240 discussed below may be performed in any suitable order and are not limited to the order shown in the illustrated embodiment of FIG. 6. Moreover, it should be noted that additional steps of the process 240 may be performed, and certain steps of the process 240 may be omitted. The process 240 may be executed by the processing system 120 and/or any other suitable processing circuitry 204 of the system 200. The process 240 may be stored on, for example, a memory device (e.g., the database 106) of the processing system 120.

The process 240 may begin with receiving a request for generating a digital currency token 212, as indicated by block 242. For example, a user of the system 200 may provide user inputs (e.g., via the user interface 208 of the user device 202) indicative of the request for generating the digital currency token 212. In response to receiving the request, the user device 202 may prompt the user to input a desired amount of digital currency and/or desired types of digital currency to be associated with (e.g., linked to, transferred to) the digital currency token 212. For example, the graphical user interface 208 may enable the user to input one or more types (e.g., Bitcoin, Ethereum) of digital currency to be associated with the digital currency token 212 and corresponding currency amounts for each of the types of digital currency to be associated with the digital currency token 212.

In response to receiving user input indicative of the amounts and/or types of digital currency to be associated with the digital currency token 212, the processing system 120 may check a digital currency wallet or digital currency exchange of the user for sufficient funds. For example, the processing system 120 may prompt to user to log in to a digital currency exchange hosting a digital currency wallet 244 of the user, such that the processing system 120 may determine types and/or quantities of digital currency in possession by the user. In some embodiments, the processing system 120 may be configured to host the digital currency wallet 244. That is, the processing system 120 may store private cryptographic keys, ciphers, digital certificates, and/or other credentials that associate particular cryptocurrency holdings to the user. In other embodiments, the digital currency wallet 244 may be hosted by a currency exchange system that is external to the processing system 120.

As indicated by block 246, the processing system 120 may determine whether the digital currency wallet 244 includes an amount of funds that is sufficient to cover the amount and type(s) of digital currency (e.g., check for sufficient funds) the user wishes to associate with the digital currency token 212. In some embodiments, in response to a determination (e.g., at block 247) that the digital currency wallet 244 lacks sufficient funds to cover the amount and type(s) of digital currency the user wishes to associate with the digital currency token 212, the processing system 120 may generate and transmit an alert message (e.g., an error message) to the user device 202, as indicated by block 248. For example, the processing system 120 may output an alert that causes the graphical user interface 208 of the user device 202 to present a visualization indicting that the digital current wallet 244 lacks sufficient funds to cover the amount and type(s) of digital currency the user wishes to associate with the digital currency token 212. Alternatively, in response to determining sufficient funding in the digital currency wallet 244 at the block 247, the processing system 120 may proceed to block 250. In some embodiments, at the block 247, the processing system 120 may request that the user temporarily transfer a sufficient amount of funds from the digital currency wallet 244 to a temporary holding wallet 252 of the processing system 120, instead of evaluating a fund status of the digital currency wallet 244 itself.

At the block 250, the processing system 120 may determine a token request type. For example, the processing system 120 may prompt the user (e.g., via the graphical user interface 208 on the user device 202) to designate a desired token type for the digital currency token 212. For example, the user device 202 may request that the user designate whether creation of a new digital currency token 212 is desired or whether an existing object (e.g., the object 232) should be used as the digital currency token 212.

In response to determining, at block 252, that the user requests generation of a new digital currency token 212, the processing system 120 may prompt the user to input (e.g., via the user device 202) design instructions for generating the digital currency token 212, as indicated by block 260. The design instructions may designate one or more desired physical attributes of the digital currency token 212 to be created. As a non-limiting example, the such physical attributes may include dimensions of the digital currency token 212 (e.g., a size of the digital currency token 212), a shape of the digital currency token 212, a color of the digital currency token 212, a texture of the digital currency token 212, a polymeric material of the digital currency token 212, or a combination thereof. The user may utilize, for example, the graphical user interface 208 to specify such design parameters. In some embodiments, the design instructions may include a position or location (e.g., a particular side or face) of the digital currency token 212 to print, spray, or otherwise apply a linking element as described in FIGS. 7 and 8.

In response to receiving the design instructions, the processing system 120 may generate manufacturing instructions (e.g., control instructions) for operating the manufacturing system 210 to produce the digital currency token 212, as indicated by block 262. Generating the manufacturing instructions may include adjusting, via the processing system 120, the design instructions to be in a format that is suitable for processing by the AM processing circuitry 214 of the manufacturing system 210, for example. The processing system 120 may transmit the manufacturing instructions to the AM processing circuitry 214 via a suitable communication channel (e.g., the network 112) and operate the manufacturing system 210, as indicated by block 266, to facilitate generation of the digital currency token 212.

Figure 7:
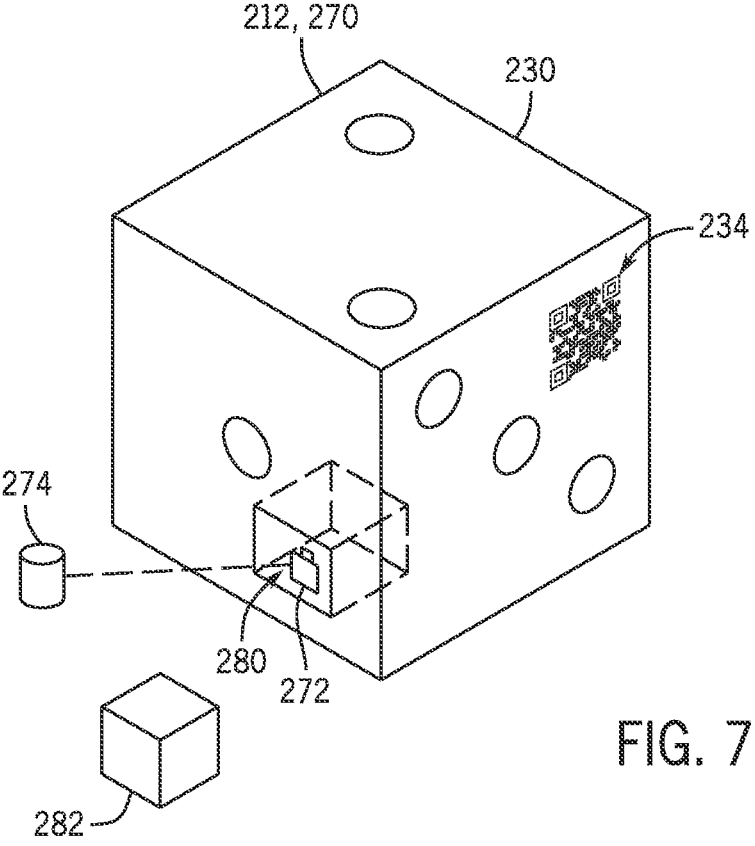
FIG. 7 is a schematic of an embodiment of a digital currency token, in accordance with embodiments described herein.

To facilitate the following discussion, FIG. 7 is a perspective view an embodiment of the digital currency token 212, referred to herein as a digital currency token 270, which may be generated by the manufacturing system 210. In the illustrated embodiment, the digital currency token 270 is manifested in the form of a playing die. For example, at the block 260, the user may specify (e.g., via the design inputs) a shape of the body 230 of the digital currency token 270 (e.g., a die shape), dimensions of the body 230, a color of the body 230, markings and/or graphics on the body 230, and so forth. As such, the processing system 120 may effectuate operation of the manufacturing system 210 to produce (e.g., 3D print or other additive manufacturing technique as described herein) the digital currency token 270 based on the user specified design instructions. It should be appreciated that the digital currency token 270 is illustrated in the form of a playing die for exemplary purposes only and may alternatively have any other suitable design and/or shape. As an example, the body 230 of the digital currency token 270 may have the shape of a figurine, an animal, or another object specified by the user in the design instructions relating to the digital currency token 270.

In some embodiments, the digital currency token 270 may include token processing circuitry 272 that, as discussed herein, may be configured to host a token wallet 274 of the digital currency token 270. In some embodiments, the manufacturing system 210 may be configured to print (e.g., 3D print or other additive manufacturing technique as described herein) the body 230 about the token processing circuitry 272, such that the token processing circuitry 272 is embedded within the digital currency token 270. That is, in such embodiments, the token processing circuitry 272 may be sealed within the body 230 and isolated from an ambient environment surrounding the token processing circuitry 272. As such, the manufacturing system 210 may incorporate the token processing circuitry 272 in the digital currency token 270, as indicated by block 276. The token processing circuitry 272 may include a battery configured to provide electrical power to the token processing circuitry 272 and a communication component 278 configured to facilitate communication (e.g., wireless communication) between the token processing circuitry 272 and an external system (e.g., the processing system 120, another electronic device). In some embodiment, the communication component 278 may facilitate wireless transmission of electrical energy to the token processing circuitry 272 and/or for wireless charging of the battery of the token processing circuitry 272. For example, the communication component 278 may include an induction charging system.

In some embodiments, the manufacturing system 210 may be configured to form a receptacle 280 in the body 230 that is configured to receive the token processing circuitry 272. That is, in such embodiments, the token processing circuitry 272 may be insertable into the receptacle 280 upon formation of the body 230. The manufacturing system 210 may be configured to generate a plug 282 that is configured to be received by at least a portion of the receptacle 236. In this way, the plug 282 may be coupled to the body 230 upon insertion of the token processing circuitry 272 into the receptacle 236, such that the plug 282 may seal the token processing circuitry 272 within the receptacle 236. In further embodiments, the digital currency token 270 may include a communication plug that enables communicative coupling of the token processing circuitry 272 to another device (e.g., the user device 202, the processing system 120) via a wired connection (e.g., a wired communication channel).

As noted above, in some embodiments, the token processing circuitry 272 may host the token wallet 274 of the digital currency token 270. The token wallet 274 may be any suitable digital currency wallet configured to receive, store (e.g., hold), and/or transfer one or more types of digital currency. At block 286, the processing system 120 may be configured to transfer the user-designated amount of funds indicated at block 242 to the token wallet 274. For example, upon generation of the digital currency token 270, the user device 202 may prompt the user to communicatively couple (e.g., wired or wirelessly) the token processing circuitry 272 to the processing system 120. Upon communicative coupling of the token processing circuitry 272 to the processing system 120, the user device 202 may prompt to user to confirm the desired transfer of digital currency set forth in block 242. Upon receiving user confirmation (e.g., via a user input at the graphical user interface 208), the processing system 120 may initiate the transfer of digital currency from the digital currency wallet 244 to the token wallet 274, as indicated by the block 286.

In this manner, the digital currency token 270 may serve as a physical manifestation of the digital currency stored on the token wallet 274. That is, the user may physically store the digital currency token 270 or physically transfer the digital currency token 270 to another user (e.g., as a gift) to facilitate storage and/or transfer of digital currency. As such, the digital currency token 270 may facilitate user awareness with respect to the digital currency currently in their possession by providing a physical manifestation of the digital currency. For example, a second user, upon receiving the digital currency token 270 from a first user having created the digital currency token 270, may communicatively couple the token processing system 120 to the processing system 120 or to another computing system (e.g., one of the digital currency transaction devices 110) to access the digital currency stored on the token wallet 274 and/or to transfer the digital currency to a corresponding digital currency wallet of the second user.

In some embodiments, the processing system 120 may prompt the user to specify a security feature that is associated with the token wallet 274. As an example, the security feature may be a user-selected passcode that is associated with the token wallet 274. As such, upon communicative coupling of the token processing system 120 to the processing system 120, the processing system 120 may prompt a user to input the passcode before enabling access to the digital currency stored on the token wallet 274. As discussed below, additionally or alternatively, the security feature may include biometric data of the user and/or a secondary security token.

Additionally or alternatively to the token processing system 120, the digital currency token 270 may include a linking element 234 that is configured to link the digital currency token 270 to the token wallet 274. For example, in some embodiments, upon receiving the request for generating the digital currency token 270 at the block 242, the processing system 120 may generate and host the token wallet 274. That is, in such embodiments, the token wallet 274 may be hosted on a suitable computing component of the processing system 120, instead of on the token processing system 120. During manufacture of the digital currency token 270 at the block 266, the manufacturing system 210 may include the linking element 234 on the digital currency token 270. As an example, the manufacturing system 210 may spray, draw, etch, engrave, or otherwise form the linking element 234 onto a surface of the body 230. The linking element 234 may include quick response (QR) code, a bar code, or another suitable feature that may be linked with the token wallet 274. The linking element 234 may be a unique identifier that is associated with the token wallet 274. As such, at the block 286, the processing system 120 may transfer digital currency from the digital currency wallet 244 of the user to the token wallet 274 hosted by the processing system 120.

To access the token wallet 274, the user (e.g., or another user) may utilize a token reader 290 (e.g., one of the digital currency transaction devices 110, a Bitcoin ATM) of the system 200, which may be configured to scan, read, or otherwise identify the linking element 234 to enable access to the token wallet 274 corresponding to the particular linking element 234. Upon identification of the linking element 234 by the token reader 290, the processing system 120 may prompt the user to complete (e.g., via the user device 202) a corresponding user identification protocol (e.g., entering a passcode, providing biometric data, etc.).

Figure 8:
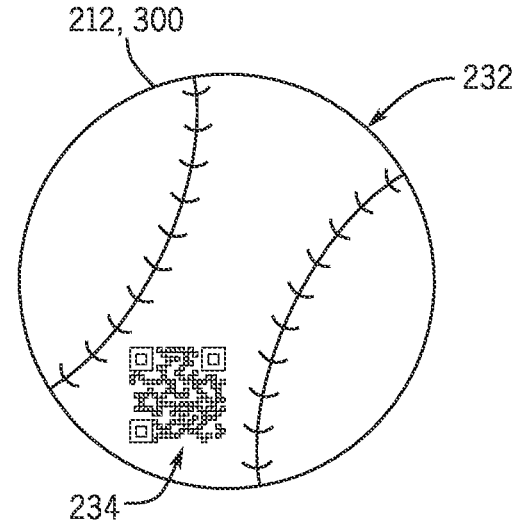
FIG. 8 is a schematic of an embodiment of a digital currency token, in accordance with embodiments described herein.

In some embodiments, at the block 252, the processing system 120 may receive a user input (e.g., at the user interface 208) to utilize a previous object as the digital currency token 270. In such embodiments, the processing system 120 may prompt the user to input a desired object into the receptacle 236 of the manufacturing system 210 to enable application of a corresponding linking element 234 to the object. For example, to facilitate the following discussion, FIG. 8 is a schematic of an embodiment of the digital currency token 270, referred to herein as a digital currency token 300, in which an object 232 serves as the basis for the digital currency token 270. In the illustrated embodiment, the object 232 is a baseball. However, it should be appreciated that the illustration of the baseball is for exemplary purposes only and the object 232 may alternatively include any other suitable object or device (e.g., a family heirloom, a toy, a trophy).

In any case, upon receiving the request for generating the digital currency token 270 using an existing object 232 (e.g., at the block 252), the processing system 120 may generate and host the token wallet 274 associated with the digital currency token 270. The manufacturing system 210 may spray, draw, etch, engrave, or otherwise form the linking element 234 onto a surface of the object 232. The linking element 234 may include a QR code, a bar code, and/or another suitable feature that may be linked with the token wallet 274. The linking element 234 may be a unique identifier that is associated with the token wallet 274. At the block 286, the processing system 120 may transfer digital currency from the digital currency wallet 244 of the user to the token wallet 274 hosted by the processing system 120 in accordance with the aforementioned techniques. To this end, the object 232 may serve as basis for the digital currency token to provide a physical manifestation of digital currency.

In certain embodiments, the digital currency tokens 270, 300 may serve as and/or otherwise be integrated with a gift card system to enable exchange of funds (e.g., gifts) between users. For example, a first user may physically transfer the digital currency token 270 to a second user. The second user may subsequently provide the digital currency token 270 to the token reader 290 to enable transfer of funds from the token wallet 274 to a corresponding digital currency wallet (e.g., a personal digital currency wallet) of the second user and/or to instruct the token reader 290 to provide an amount of physical currency corresponding to the amount of digital currency on the token wallet 274.

In some embodiments, the processing system 120 may enable the user to insure the digital currency tokens 270, 300 in case of theft or loss of the digital currency tokens 270, 300, for example. In such embodiments, the user interface 208 may prompt the user to select or otherwise specify a desired insurance policy through which the user may insure any one or combination of various digital currency tokens 212. In some embodiments, payment of the insurance policy may be linked to the token wallet 274. As an example, the processing system 120 may be configured to deduct an insurance policy premium (e.g., a monthly payment, a semi-annual payment, an annual payment) from to token wallet 274 and provide the insurance policy premium (e.g., in the form of digital currency) to an insurance enterprise providing the insurance policy.

Figure 9:
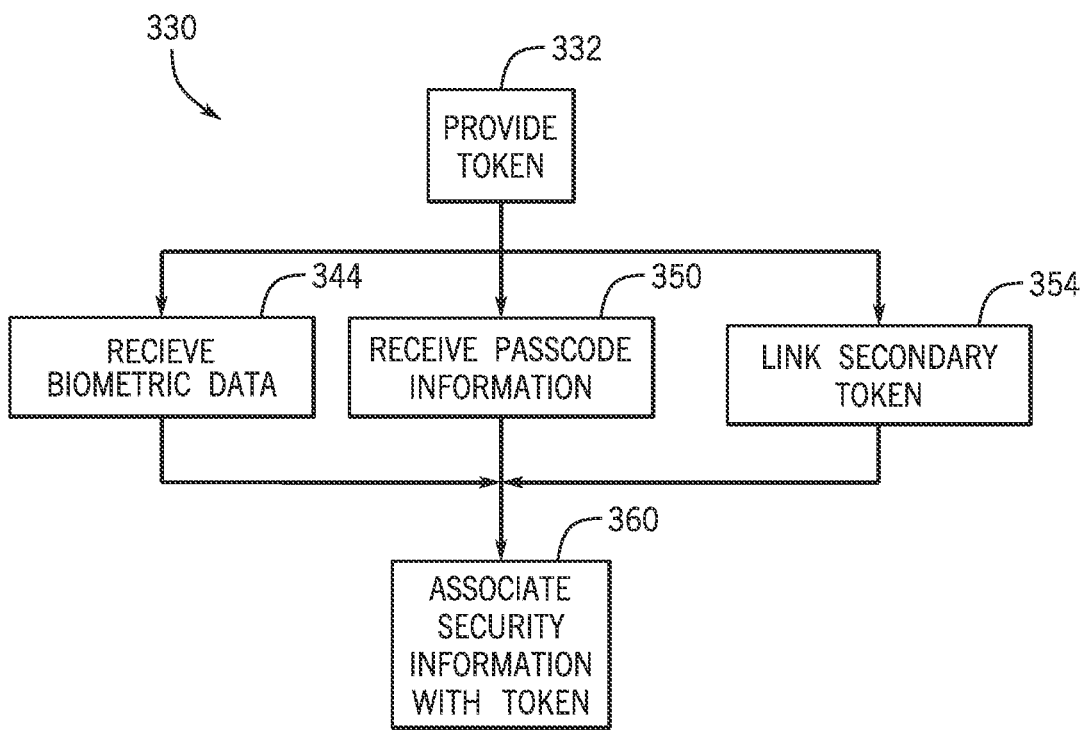
FIG. 9 is a schematic of an embodiment of a process for providing security features for a digital currency token, in accordance with embodiments described herein.

As noted above, in certain embodiments, the digital currency tokens 270, 300 may be associated with one or more security features (e.g., security information) that may facilitate enabling authorized access to the corresponding token wallet 274 while blocking unauthorized access to the token wallet 274. To facilitate the following discussion, FIG. 9 is flow diagram of an embodiment of a process 330 for operating the system 200 in accordance with the presently disclosed techniques. FIG. 9 will be referred to concurrently with FIG. 5 throughout the following discussion. It should be noted that the steps of the process 330 discussed below may be performed in any suitable order and are not limited to the order shown in the illustrated embodiment of FIG. 9.

Moreover, it should be noted that additional steps of the process 330 may be performed, and certain steps of the process 330 may be omitted. The process 330 may be executed by the processing system 120 and/or any other suitable processing circuitry of the system 200. The process 330 may be stored on, for example, a memory device (e.g., the database 106) of the processing system 120.

The process 330 may begin with identifying a digital currency token 212, such as the digital currency token 270 and/or the digital currency token 300, at the processing system 120, as indicated by the block 332. For example, a sensor 340 of the processing system 120 may be configured to read (e.g., scan) the linking element 234 to identify the digital currency token 212 associated with the linking element 234. Additionally or alternatively, the processing system 120 may establish a communicative connection with the token processing circuitry 272 to identify the particular digital currency token 212. For clarity, while the following discussion continues with reference to the digital currency token 270, it should be understood that the process 330 may be similarly implemented to assign security features to the digital currency token 300 and/or to another digital currency token 212.

Upon identification of the digital currency token 270, the processing system 120 may collect biometric data of the user, as indicated by block 344. For example, the processing system 120 may utilize one or more sensors 348 to scan a fingerprint of the user, to acquire a retinal scan of the user, to scan a face of the user, or to collect other suitable biometric data of the user. Additionally or alternatively, the processing system 120 may prompt the user to input a passcode (e.g., a numerical code, an alphanumeric code), as indicate by the block 350. Any one or combination of the data collected by the processing system 120 at the blocks 344 and 350 may be stored on the database 104 and/or the distributed ledger 140, for example. In certain embodiments, the processing system 120 may link a secondary identification token (e.g., a physical security device) with the digital currency token 270, as indicated by the block 354. The processing system 120 may associate the security information collected at the blocks 344, 350, and/or 354 with the digital currency token 270, as indicated by block 360.

In some embodiments, upon execution of the process 240 to associate security information with a given digital currency token 212, the processing system 120 may request that the user provide any one or combination of the security information prior to providing access to the digital currency wallet 244. For example, in response to receiving the digital currency token 270 at the token reader 290 (e.g., an additional user device, the Bitcoin ATM), the processing system 120 may read the digital currency token 270 to identify the token wallet 274. That is, the processing system 120 may scan the linking element 234 and/or establish a communicative connection with the token processing system 120 to identify the token wallet 274. In some embodiments, the token reader 290 may include one or more additional sensors 366 configured to collect additional biometric data of the user. The processing system 120 may be configured to compare the additional biometric data of the user to the biometric data of the user stored on the processing system 120 at the block 360. The processing system 120 may be configured to enable user access to the token wallet 274 upon a determination that a deviation between the biometric data collected at the block 344 and the additional biometric data collected via the one or more additional sensors 366 is less than a threshold amount. Additionally or alternatively to the aforementioned biometric analysis, the processing system 120 may request that the user input the password (e.g., as previously provided at block 350) or provide the secondary security token (e.g., as linked in block 354) prior to enabling access to the token wallet 274.

Figure 10:
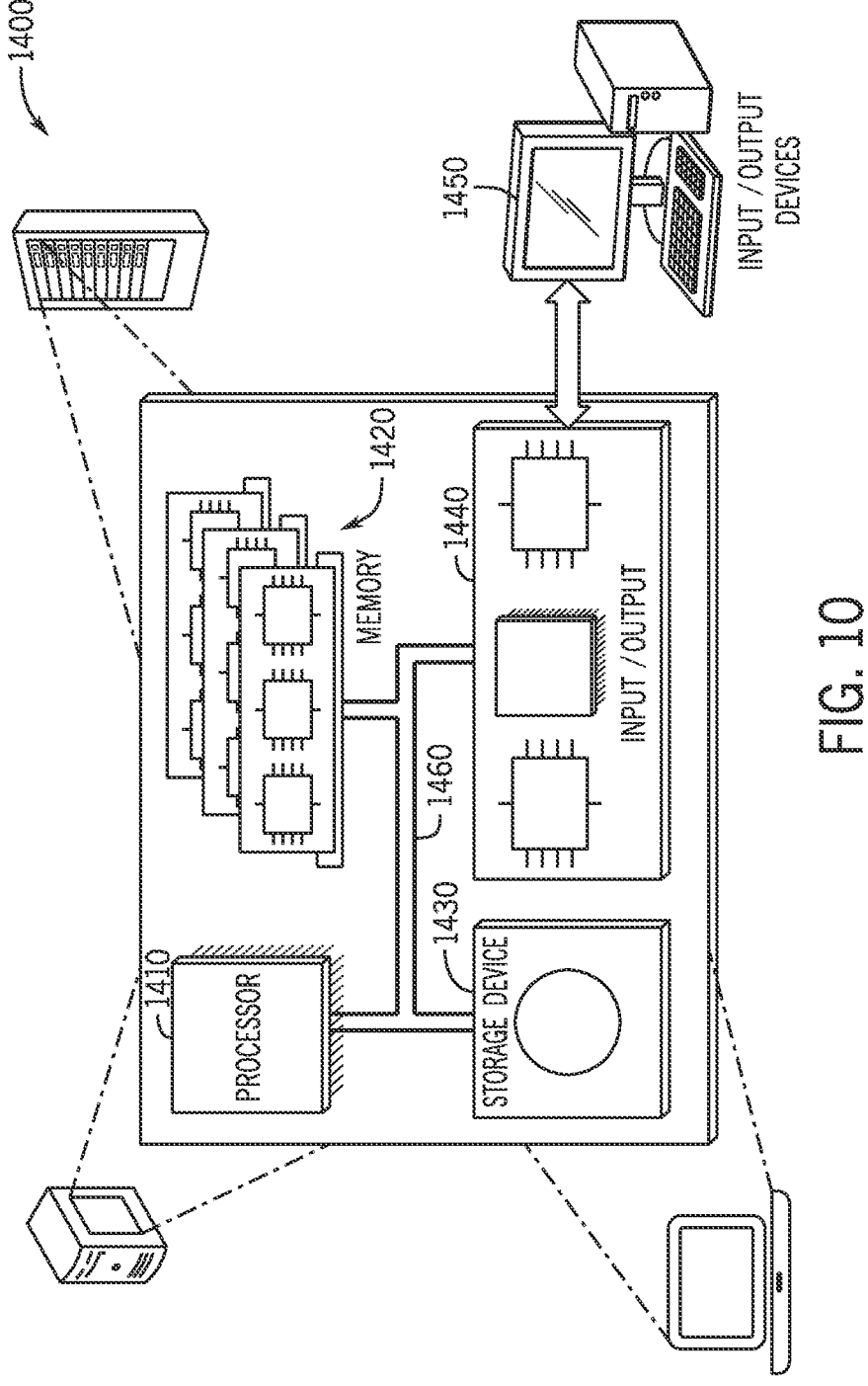
FIG. 10 is a schematic of an embodiment of a processing system that may facilitate supporting a digital currency infrastructure, in accordance with embodiments described herein.

FIG. 10 illustrates an example computing system 1400 (e.g., the processing system 120) that the embodiments described herein may use to perform their respective operations. The system 1400 may be used for any of the operations described with respect to the various embodiments described herein, including user device(s) 108, digital currency transaction devices 110, a merchant server 114, a financial institution server (e.g., an acquiring bank server) 116, a facilitating server 118, a digital transactions server 102, a computer terminal 106, and so forth. For example, the system 1400 may be included, at least in part, in one or more of the computing device(s) and/or other computing device(s) or system(s) described herein. In certain embodiments, the system 1400 may include one or more processors 1410, one or more memory 1420, one or more storage devices 1430, and one or more input/output (I/O) devices 1450 controllable via one or more I/O interfaces 1440. The various components 1410, 1420, 1430, 1440, or 1450 may be interconnected via at least one system bus 1460, which may enable the transfer of data between the various modules and components of the system 1400.

In certain embodiments, the processor(s) 1410 may be configured to process instructions for execution within the system 1400. The processor(s) 1410 may include single-threaded processor(s), multi-threaded processor(s), or both. The processor(s) 1410 may be configured to process instructions stored in the memory 1420 or on the storage device(s) 1430. For example, the processor(s) 1410 may execute instructions for the various software module(s) described herein. The processor(s) 1410 may include hardware-based processor(s) each including one or more cores. The processor(s) 1410 may include general purpose processor(s), special purpose processor(s), or both.

In certain embodiments, the memory 1420 may store information within the system 1400. In certain embodiments, the memory 1420 includes one or more computer-readable media. The memory 1420 may include any number of volatile memory units, any number of non-volatile memory units, or both volatile and non-volatile memory units. The memory 1420 may include read-only memory, random access memory, or both. In certain embodiments, the memory 1420 may be employed as active or physical memory by one or more executing software modules.

In certain embodiments, the storage device(s) 1430 may be configured to provide (e.g., persistent) mass storage for the system 1400. In certain embodiments, the storage device(s) 1430 may include one or more computer-readable media. For example, the storage device(s) 1430 may include a floppy disk device, a hard disk device, an optical disk device, or a tape device. The storage device(s) 1430 may include read-only memory, random access memory, or both. The storage device(s) 1430 may include one or more of an internal hard drive, an external hard drive, or a removable drive.

One or both of the memory 1420 or the storage device(s) 1430 may include one or more computer-readable storage media (CRSM). The CRSM may include one or more of an electronic storage medium, a solid-state storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1400. In certain embodiments, the CRSM may include a data store that provides storage of computer-readable instructions or other information in a non-transitory format. The CRSM may be incorporated into the system 1400 or may be external with respect to the system 1400. The CRSM may include read-only memory, random access memory, or both. One or more CRSM suitable for tangibly embodying computer program instructions and data may include any type of non-volatile memory, including but not limited to, semiconductor memory devices, such as EPROM, EEPROM, and flash memory devices; magnetic disks such as internal hard disks and removable disks; magneto-optical disks; and CD-ROM and DVD-ROM disks. In certain embodiments, the processor(s) 1410 and the memory 1420 may be supplemented by, or incorporated into, one or more application-specific integrated circuits (ASICs).

In certain embodiments, the system 1400 may include one or more I/O devices 1450. The I/O device(s) 1450 may include one or more input devices such as a keyboard, a mouse, a pen, a game controller, a touch input device, an audio input device (e.g., a microphone), a gestural input device, a haptic input device, an image or video capture device (e.g., a camera), or other devices. In certain embodiments, the I/O device(s) 1450 may also include one or more output devices such as a display, LED(s), an audio output device (e.g., a speaker), a printer, a haptic output device, and so forth. The I/O device(s) 1450 may be physically incorporated in one or more computing devices of the system 1400 or may be external on one or more computing devices of the system 1400.

In certain embodiments, the system 1400 may include one or more I/O interfaces 1440 to enable components or modules of the system 1400 to control, interface with, or otherwise communicate with the I/O device(s) 1450. The I/O interface(s) 1440 may enable information to be transferred in or out of the system 1400, or between components of the system 1400, through serial communication, parallel communication, or other types of communication. For example, the I/O interface(s) 1440 may comply with a version of the RS-832 standard for serial ports, or with a version of the IEEE AA884 standard for parallel ports. As another example, the I/O interface(s) 1440 may be configured to provide a connection over Universal Serial Bus (USB) or Ethernet. In certain embodiments, the I/O interface(s) 1440 may be configured to provide a serial connection that is compliant with a version of the IEEE AA994 standard.

In certain embodiments, the I/O interface(s) 1440 may also include one or more network interfaces that enable communications between computing devices in the system 1400, or between the system 1400 and other network-connected computing systems. The network interface(s) may include one or more network interface controllers (NICs) or other types of transceiver devices configured to send and receive communications over one or more communication networks using any network protocol.

Computing devices of the system 1400 may communicate with one another, or with other computing devices, using one or more communication networks. Such communication networks may include public networks such as the Internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., 3G, 4G, 5G, Edge, etc.), and so forth. In certain embodiments, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1400 may include any number of computing devices of any type. The computing device(s) may include, but are not limited to, a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), certain embodiments are not so limited. For example, in certain embodiments, a computing device may include one or more of a virtual computing environment, a hypervisor, an emulation, or a virtual machine executing on one or more physical computing devices. In addition, in certain embodiments, two or more computing devices may include a cluster, cloud, farm, or other grouping of multiple devices that coordinate operations to provide load balancing, failover support, parallel processing capabilities, shared storage resources, shared networking capabilities, or other aspects.

All of the functional operations described herein may be realized in digital electronic circuitry, or in computer software, firmware, or hardware, including the structures described herein and their structural equivalents, or in combinations of one or more of them. The embodiments described herein may be realized as one or more computer program products, i.e., one or more modules of computer program instructions encoded on a computer-readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or a combination of one or more of them). A propagated signal is an artificially generated signal (e.g., a machine-generated electrical, optical, or electromagnetic signal that is generated to encode information for transmission to suitable receiver apparatus).

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flow described herein may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor may receive instructions and data from a read-only memory or a random access memory or both. Elements of a computer may include a processor for performing instructions and one or more memory devices for storing instructions and data. Generally, a computer may also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, certain embodiments may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

The embodiments described herein may be realized in a computing system 1400 that includes a back-end component, e.g., as a data server, or that includes a middleware component, e.g., an application server, or that includes a front-end component, e.g., a client computer having a graphical user interface or a web browser through which a user may interact with an with the system 1400, or any appropriate combination of one or more such back-end, middleware, or front end components. The components of the system 1400 may be interconnected by any appropriate form or medium of digital data communication, e.g., a communication network. Examples of communication networks include a local area network ("LAN") and a wide area network ("WAN"), e.g., the Internet.

In certain embodiments, the computing system 1400 may include clients and servers. A client and server are generally remote from each other and typically interact through a communication network. The relationship of client and server arises by computer programs running on the respec- tive computers and having a client-server relationship to each other.

While this disclosure contains many specifics, these should not be construed as limitations on the scope of the disclosure or of what may be claimed, but rather as descrip- tions of features specific to particular embodiments. Certain features that are described in this disclosure in the context of separate embodiments may also be implemented in combi- nation in a single embodiment. Conversely, various features that are described in the context of a single embodiment may also be implemented in multiple embodiments separately or in any suitable sub-combination. Moreover, although fea- tures may be described herein as acting in certain combi- nations and even initially claimed as such, one or more features from a claimed combination may in certain embodi- ments be excised from the combination, and the claimed combination may be directed to a sub-combination or varia- tion of a sub-combination.

Similarly, while operations are depicted in the drawings in a particular order, this should not be understood as requiring that such operations be performed in the particular order shown or in sequential order, or that all illustrated operations be performed, to achieve desirable results. In certain embodiments, multitasking and parallel processing may be advantageous. Moreover, the separation of various system components in the embodiments described herein should not be understood as requiring such separation in all embodi- ments, and it should be understood that the described program components and systems may generally be inte- grated together in a single software product or packaged into multiple software products.

A number of embodiments have been described herein. Nevertheless, it will be understood that various modifica- tions may be made without departing from the spirit and scope of the disclosure. For example, various forms of the flows described herein may be used, with steps re-ordered, added, or removed. Accordingly, other embodiments are within the scope of the following claims.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are refer- enced and applied to material objects and concrete examples of a practical nature that demonstrably improve the present technical field and, as such, are not abstract, intangible or purely theoretical. Further, if any claims appended to the end of this specification contain one or more elements desig- nated as "means for (perform)ing (a function)" or "step for (perform)ing (a function)", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method for providing a physical manifestation of digital currency, comprising:

receiving, via an input at a first user device, a request for generating a digital currency token, wherein the request comprises an instruction for transferring an amount of digital currency from a digital currency wallet to a token wallet linked with the digital currency token;

generating, via an additive manufacturing system, a body of the digital currency token, wherein the digital cur- rency token enables access to the token wallet;

providing a processing system within the body of the digital currency token;

receiving, via a first sensor of the processing system, biometric data of a user associated with the digital currency token;

storing, via the processing system, the biometric data on the processing system, wherein the biometric data is linked with the digital currency;

receiving, via the processing system, a request to access the token wallet subsequent to storing the biometric data;

reading, at a second user device, the digital currency token to identify the token wallet based on the request;

verifying, via the processing system, presence of the amount of digital currency on the digital currency wallet;

receiving, at a second sensor of the second user device, additional biometric data of the user;

comparing, via the processing system, the additional biometric data to the stored biometric data that is linked to the digital currency;

enabling, via the processing system, user access to the token wallet upon a determination that a deviation between the biometric data and the additional biometric data is less than a threshold amount; and in response to verifying the presence of the amount of digital currency and enabling the user access to the token wallet, transferring, via the processing system, the amount of digital currency from the digital currency wallet to the token wallet such that access to the digital currency involves possession of the digital currency token.

2. The method of claim 1, wherein receiving the request for generating the digital currency token comprises receiv- ing a design instruction corresponding to a user-designated design of the digital currency token, wherein the design instruction indicates one or more physical attributes of the digital currency token.

3. The method of claim 2, wherein generating the digital currency token comprises:

operating, based on design instructions, the additive manufacturing system to print an additively manufac- tured item having the one or more physical attributes, wherein the digital currency token comprises the addi- tively manufactured item.

4. The method of claim 3, wherein generating the digital currency token comprises forming, via the additive manu- facturing system, a receiving port in the additively manu- factured item, wherein the receiving port is configured to receive a token processing component of the digital currency token, and wherein the token processing component is configured to host the token wallet.

5. The method of claim 4, wherein generating the digital currency token comprises forming, via the additive manu- facturing system, a plug configured to seal the receiving port to encapsulate the token processing component within the additively manufactured item.

6. The method of claim 4, comprising coupling a wireless communication component to the token processing compo- nent, wherein the wireless communication component is configured to enable wireless transmission of data and/or electrical power between the token processing component and the processing system.

7. The method of claim 1, comprising hosting, via the processing system, the token wallet.

8. The method of claim 7, comprising:

receiving, at a receptacle of the additive manufacturing system, an object; and printing, via a print head of the additive manufacturing system, the digital currency token onto the object, wherein the digital currency token is readable by the first user device or the second user device to enable access to the digital currency on the token wallet.

9. The method of claim 1, wherein the digital currency token comprises a three-dimensional (3D) digital currency token.

10. A method for providing a physical manifestation of digital currency, comprising:

receiving, at a processing system, an instruction for generating a digital currency token, wherein the instruction comprises design instructions for the digital currency token, and wherein the design instructions indicate one or more physical attributes of the digital currency token;

generating, via an additive manufacturing system, a body of the digital currency token in accordance with the design instructions, wherein the digital currency token comprises a linking element configured to associate the digital currency token with a token wallet corresponding to the digital currency token;

providing a token processing system within the body of the digital currency token;

receiving, via a first sensor of the token processing system, biometric data of a user associated with the digital currency token;

storing the biometric data on the token processing system, wherein the biometric data is linked with the digital currency;

communicatively coupling the token processing system to a user device;

receiving, at the processing system, an additional instruction for transferring an amount of digital currency from a digital currency wallet to the token wallet;

receiving, at a second sensor of the user device, additional biometric data of the user based on the additional instruction;

comparing the additional biometric data to the stored biometric data that is linked to the digital currency;

enabling user access to the token wallet on the token processing system upon a determination that a deviation between the biometric data and the additional biometric data is less than a threshold amount; and in response to receiving the additional instruction and enabling the user access to the token wallet, transferring, via the processing system, the amount of digital currency from the digital currency wallet to the token wallet.

11. The method of claim 10, comprising:

receiving, at a user interface of the user device, an indication of the one or more physical attributes based on user input at the user interface, wherein the one or more physical attributes comprise a size of the digital currency token, a shape of the digital currency token, a color of the digital currency token, a texture of the digital currency token, or a combination thereof; and transmitting, via a communication channel, the design instructions defining the one or more physical attributes to the processing system.

12. The method of claim 10, comprising:

hosting, via the processing system, the token wallet of the digital currency token;

reading, at the user device, the linking element; and in response to reading the linking element, enabling access to the token wallet via the user device.

13. The method of claim 12, wherein the linking element comprises a quick response (QR) code.

14. The method of claim 12, wherein generating the digital currency token comprises embedding, via the additive manufacturing system, token processing circuitry within a body of the digital currency token, wherein the token processing circuitry comprises the linking element and is configured to host the token wallet.

15. The method of claim 10, wherein the digital currency token comprises a three-dimensional (3D) digital currency token.

16. A method for providing a physical manifestation of digital currency, comprising:

receiving, at a receptacle of an additive manufacturing system, an object serving as basis for a digital currency token;

printing, via a print head of the additive manufacturing system, a linking element of the digital currency token onto a body of the object, wherein the digital currency token is associated with a token wallet configured to receive digital currency;

providing a processing system within the body of the object;

receiving, via a first sensor of the processing system, biometric data of a user associated with the digital currency token;

storing, via the processing system, the biometric data on the processing system;

linking, via the processing system, the biometric data with the digital currency token;

receiving, at the processing system, an instruction for transferring an amount of digital currency from a digital currency wallet to the token wallet;

receiving, at a second sensor of a user device, additional biometric data of the user based on the instruction;

comparing, via the processing system, the additional biometric data to the stored biometric data that is linked to the digital currency;

enabling, via the processing system, user access to the token wallet upon a determination that a deviation between the biometric data and the additional biometric data is less than a threshold amount; and in response to receiving the instruction and enabling the user access to the token wallet, transferring, via the processing system, the amount of digital currency from the digital currency wallet to the token wallet.

17. The method of claim 16, comprising hosting, via the processing system, the token wallet.

18. The method of claim 16, wherein the digital currency token comprises a three-dimensional (3D) digital currency token.

* * * * *